US012724171B2

(12) United States Patent
Zhang et al.

(10) Patent No.: US 12,724,171 B2
(45) Date of Patent: Sep. 1, 2026

(54) IDENTIFYING UNCONFORMITIES IN SUBSURFACE FORMATIONS

(71) Applicant: Saudi Arabian Oil Company, Dhahran (SA)

(72) Inventors: Sihai Zhang, Dhahran (SA); Anren Li, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 426 days.

(21) Appl. No.: 18/355,927

(22) Filed: Jul. 20, 2023

(65) Prior Publication Data

US 2025/0028072 A1 Jan. 23, 2025

(51) Int. Cl.
*G01V 11/00* (2006.01)
*E21B 25/00* (2006.01)
(Continued)

(52) U.S. Cl.
CPC ............ *G01V 11/002* (2013.01); *E21B 25/00* (2013.01); *E21B 47/002* (2020.05); (Continued)

(58) Field of Classification Search
CPC .... G01V 11/002; G01V 1/50; G01V 2210/66; G01V 5/04; E21B 25/00; E21B 47/002; (Continued)

(56) References Cited

U.S. PATENT DOCUMENTS 5,363,299 A * 11/1994 Hurley .................... G01V 3/20 702/10
2015/0134255 A1 * 5/2015 Zhang ..................... G01V 1/40 702/14

(Continued)

FOREIGN PATENT DOCUMENTS

CN 106405653 2/2017
CN 106842298 6/2017

(Continued)

OTHER PUBLICATIONS

International Search Report and Written Opinion in International Appln. No. PCT/US2024/037560, mailed on Oct. 24, 2024, 14 pages.

(Continued)

*Primary Examiner* — Eman A Alkafawi
*Assistant Examiner* — Dilara Sultana
(74) *Attorney, Agent, or Firm* — Fish & Richardson P.C.

(57) ABSTRACT

Systems and methods for identifying an unconformity in a subsurface formation include collecting well log measurements from a set of wells in the subsurface formation and collecting core samples from a first subset of the set of wells. A second subset of wells without lithology contrast is identified. Fractures and bedding planes are characterized in borehole image logs for wells in the second subset. For wells in the first and second subsets, the location of the unconformity is determined based on the core samples, and correlations are generated between the determined location of the unconformity and the identified fractures and bedding planes in the borehole image logs. For wells in the second subset and not in the first subset: the location of the unconformity is determined based on the identified fractures, bedding planes, and generated correlations. An unconformity surface is generated.

20 Claims, 8 Drawing Sheets

(51) Int. Cl.
*E21B 47/002* (2012.01)
*E21B 49/00* (2006.01)
*G01V 1/50* (2006.01)

(52) U.S. Cl.
CPC .......... *E21B 47/0025* (2020.05); *E21B 49/00* (2013.01); *G01V 1/50* (2013.01); *E21B 2200/20* (2020.05); *G01V 2210/66* (2013.01)

(58) Field of Classification Search
CPC ... E21B 47/0025; E21B 49/00; E21B 2200/20
See application file for complete search history.

(56) References Cited

U.S. PATENT DOCUMENTS

| | | | | |
|---|---|---|---|---|
| 2017/0205531 | A1 | 7/2017 | Berard et al. | |
| 2018/0252101 | A1* | 9/2018 | Bartetzko | E21B 44/00 |
| 2019/0265373 | A1* | 8/2019 | Ito | G01V 20/00 |
| 2021/0102457 | A1* | 4/2021 | Dupont | E21B 47/04 |
| 2021/0156248 | A1 | 5/2021 | Mahmood et al. | |
| 2021/0247534 | A1* | 8/2021 | Bø | G01V 1/306 |
| 2023/0193751 | A1 | 6/2023 | Li et al. | |

FOREIGN PATENT DOCUMENTS

| | | |
|---|---|---|
| CN | 106526679 | 5/2018 |
| CN | 110320558 | 10/2019 |
| CN | 108756869 | 6/2020 |
| CN | 107269269 | 7/2020 |
| CN | 109298064 | 7/2021 |
| CN | 109814174 | 7/2021 |
| WO | WO 2023081113 A1 | 5/2023 |

OTHER PUBLICATIONS

Geng et al., "Paleokarst system based on FMI facies analysis: a case study in the Yingshan Formation at the Tazhong uplift in the Tarim Basin, Northwest China," Arab J Geosci, 2016, 9(634):1-15.

Momeni et al., "Fracture and fluid flow paths analysis of an offshore carbonate reservoir using oil-based mud images and petrophysical logs," Marine and Petroleum Geology, 2019, 109:349-360.

Chang, "Unconformity-bounded stratigraphic units," Geological Society of America Bulletin, Nov. 1, 1975, 86(11):1544-1552, 10 pages.

Feng et al., "Logging identification method of depositional facies in Sinian Dengying Formation of the Sichuan Basin," Petroleum Science, Available online Jul. 12, 2021, 18:1086-1096, 11 pages.

Valentin et al., "A deep residual convolutional neural network for automatic lithological facies identification in Brazilian pre-salt oilfield wellbore image logs," Journal of Petroleum Science and Engineering, Available online Apr. 19, 2019, 179:474-503, 30 pages.

* cited by examiner 700
710
712
Field Operations(s)
Computational Operation(s)
Database(s)
718
Computer System(s)
720
Output(s)
722

IDENTIFYING UNCONFORMITIES IN SUBSURFACE FORMATIONS

TECHNICAL FIELD

The present disclosure relates to identifying unconformities in subsurface formations.

BACKGROUND

An unconformity is a buried erosional or non-depositional surface separating two rock strata of different ages in a subsurface formation. An unconformity can indicate stratigraphy hiatus. An unconformity can form a path for oil and gas migration within the subsurface formation. In some cases, an unconformity forms a seal preventing oil and gas migration with oil and gas accumulating near the unconformity surface. Conventionally, an unconformity can be identified in seismic sections. For example, horizontally parallel strata of sedimentary rock deposits are identified on tilted and eroded layers of sedimentary rock. An unconformity can also be identified using lithology logs when the sedimentary rock above and below the unconformity have different lithologies (e.g., a lithology contrast).

SUMMARY

This disclosure describes systems and methods for identifying an unconformity in a subsurface formation based on fracture and bedding plane characterization using borehole image logs. Identifying an unconformity can be challenging when no lithology contrasts between the sedimentary layers above and below the unconformity exist. Multiple wells in an area of interest of the subsurface formation are selected. Well log data including porosity logs, gamma ray logs, and borehole image logs are collected. Core samples are collected from a subset of the wells. For wells with lithology contrast, unconformities are identified using the porosity and gamma ray logs. For wells with core samples and without lithology contrast, the unconformity is identified using the core samples. Correlations between core samples with identified unconformities and corresponding fractures and bedding planes identified in borehole image logs are generated. For wells without core samples and without lithology contrast, fractures and bedding planes are identified in the borehole image logs and the unconformity is identified based on the generated correlations. An unconformity surface mapping the location of the unconformity in the subsurface formation is generated.

In one aspect, a method for identifying an unconformity in a subsurface formation includes collecting well log measurements from a set of wells in the subsurface formation, the well log measurements including gamma ray logs, porosity logs, and borehole image logs; collecting core samples from a first subset of the set of wells; identifying a second subset of the set of wells including wells without lithology contrast based on the gamma ray logs and the porosity logs; characterizing fractures and bedding planes in the borehole image logs for wells in the second subset; for wells included in the first subset and the second subset: determining a location of the unconformity in the wells based on the core samples; generating correlations between the determined location of the unconformity based on the core samples and the identified fractures and bedding planes in the borehole image logs; for wells included in the second subset and not included in the first subset: determining the location of the unconformity in the wells based on the identified fractures and bedding planes and based on the generated correlations; and generating an unconformity surface based on the determined locations of the unconformity from the set of wells.

In one aspect, a system for identifying unconformities in a subsurface formation includes at least one processor; and a memory storing instructions that, when executed by the at least one processor, cause the at least one processor to perform operations including accessing, from a data store, well log measurements from a set of wells in the subsurface formation, the well log measurements including gamma ray logs, porosity logs, and borehole image logs; accessing, from a data store, core sample data from a first subset of the set of wells; identifying a second subset of the set of wells including wells without lithology contrast based on the gamma ray logs and the porosity logs; characterizing fractures and bedding planes in the borehole image logs for wells in the second subset; for wells included in the first subset and the second subset: determining a location of the unconformity in the wells based on the core sample data; generating correlations between the determined location of the unconformity based on the core sample data and the identified fractures and bedding planes in the borehole image logs; for wells included in the second subset and not included in the first subset: determining the location of the unconformity in the wells based on the identified fractures and bedding planes and based on the generated correlations; and generating an unconformity surface based on the determined locations of the unconformity from the set of wells.

In one aspect, one or more non-transitory machine-readable storage devices storing instructions for identifying unconformities in a subsurface formation, the instructions being executable by one or more processors, to cause performance of operations including accessing, from a data store, well log measurements from a set of wells in the subsurface formation, the well log measurements including gamma ray logs, porosity logs, and borehole image logs; accessing, from a data store, core sample data from a first subset of the set of wells; identifying a second subset of the set of wells including wells without lithology contrast based on the gamma ray logs and the porosity logs; characterizing fractures and bedding planes in the borehole image logs for wells in the second subset; for wells included in the first subset and the second subset: determining a location of the unconformity in the wells based on the core sample data; generating correlations between the determined location of the unconformity based on the core sample data and the identified fractures and bedding planes in the borehole image logs; for wells included in the second subset and not included in the first subset: determining the location of the unconformity in the wells based on the identified fractures and bedding planes and based on the generated correlations; and generating an unconformity surface based on the determined locations of the unconformity from the set of wells.

Implementations of these aspects can include one or more of the following features.

In some implementations, these aspects include identifying drilling hazards in the subsurface formation based on the unconformity surface. In some cases, these aspects include determining locations to drill wells in the subsurface formation based on the identified drilling hazards; and drilling wells in the subsurface formation based on the determined locations.

In some implementations, these aspects include determining that wells of the set of wells include a lithology contrast defining a third subset of the set of wells; and determining the location of the unconformity in the wells of the third subset based on the porosity logs and the gamma ray logs.

In some implementations, generating correlations includes training a machine learning model using well log data labeled based on core sample data. In some cases, determining locations of the unconformity in the wells included in the second subset and not included in the first subset includes labeling borehole image logs by the trained machine learning model.

In some implementations, determining locations of the unconformity in the wells included in the second subset and not included in the first subset includes performing cross-correlations between borehole image logs with the identified unconformity and borehole image logs of the wells included in the second subset and not included in the first subset; and selecting the location within the well with a highest correlation factor.

In some implementations, identifying fractures and bedding planes in the borehole image logs includes identifying fracture density and orientation.

In some implementations, generating correlations includes training a machine learning model using well log data labeled based on the core sample data; and determining locations of the unconformity in the wells included in the second subset and not included in the first subset includes labeling borehole image logs by the trained machine learning model.

Implementations of the systems and methods of this disclosure can provide various technical benefits. Generally, unconformities in subsurface formations are detected by drilling wells and obtaining data using well cores. Well cores can provide details regarding bedding form including fracture density and orientation near the well. However, obtaining core data is expensive and time consuming. Obtaining core data requires specialized equipment that is not always available for each well that is drilled. The methods and systems described herein are configured for identifying unconformities in subsurface formations from the borehole image log and without lithology contrast in wells independent of obtaining core samples. The systems and processes described here, therefore, require processing of less data in comparison to conventional techniques. The amount of data collected is reduced, and the corresponding cost of characterizing the subsurface formation is reduced. The systems and methods described herein are configured to use the generated unconformity surface to identify locations for drilling wells and identifying drilling hazards within the subsurface formation.

Additionally, the systems and methods described herein can enable production operations to proceed more quickly and with fewer costs for physical drilling of wells. For example, the data processing system described herein can be a part of a well drilling system in which the data processing system sends one or more controls to well drilling equipment for controlling extraction of hydrocarbons from the subsurface formation. For example, the data processing system can identify a specific location within the subsurface formation having fracture density and orientation characteristics that are favorable for hydrocarbon deposits. The data processing system can identify these locations to the system or to an operator of the system for potentially drilling an additional well or performing other production operations.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for identifying an unconformity in a subsurface formation based on fracture and bedding plane characterization using borehole image logs. Multiple wells in an area of interest of the subsurface formation are selected. Well log data including porosity logs, gamma ray logs, and borehole image logs are collected. Core samples are collected from a subset of the wells. For wells with lithology contrast, an unconformity is identified using the porosity and gamma ray logs. For wells with core samples and without lithology contrast, the unconformity is identified using the core samples. Correlations between core samples with identified unconformities and corresponding fractures and bedding planes identified in borehole image logs are generated. For wells without core samples and without lithology contrast, fractures and bedding planes are identified in the borehole image logs and the unconformity is identified based on the generated correlations. An unconformity surface mapping the location of the unconformity in the subsurface formation is generated.

Figure 1:
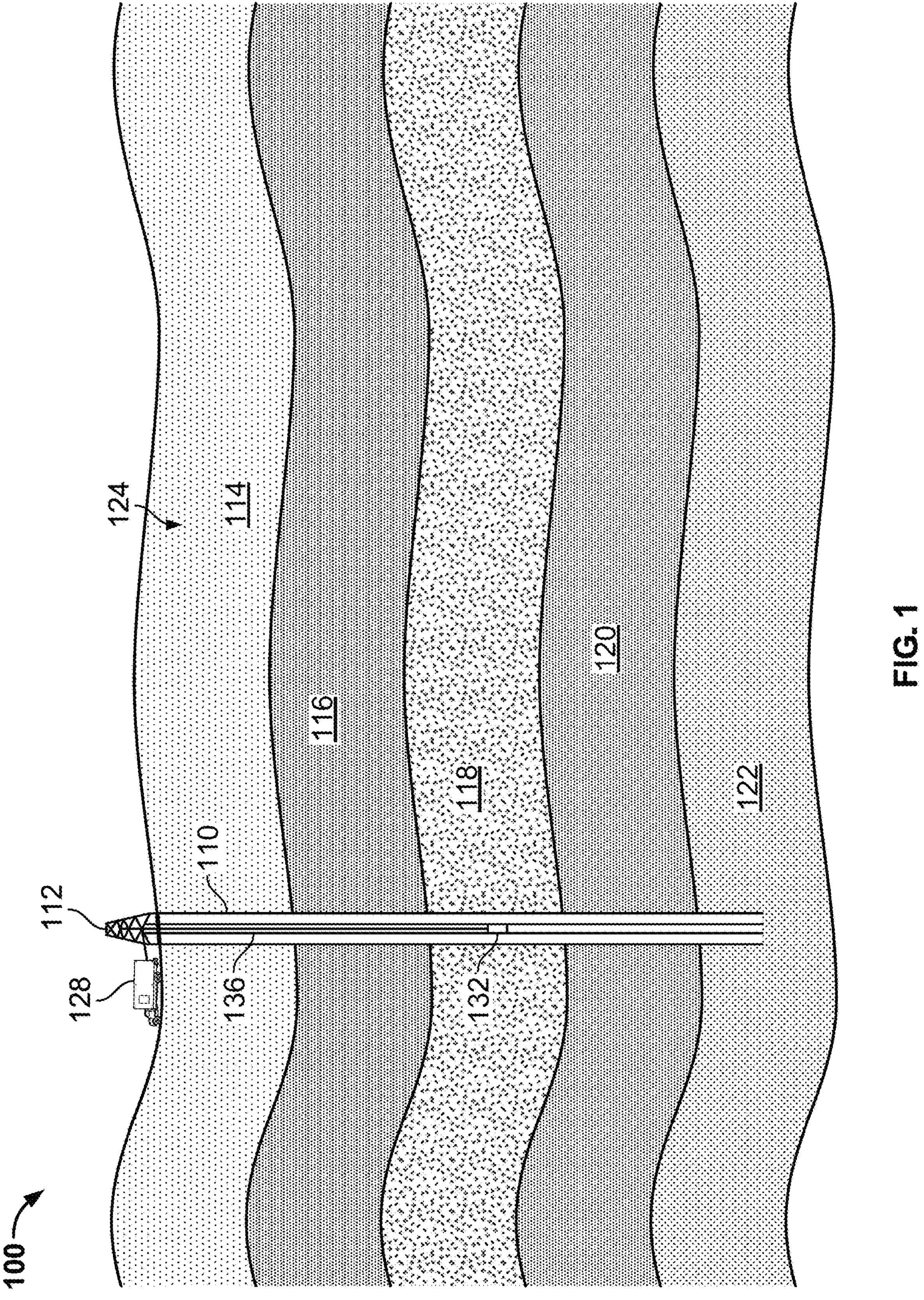
FIG. 1 is a schematic illustrating a wireline operation.

FIG. 1 illustrates a wireline operation 100 (e.g., a well logging operation) in which a wellbore 110 extends downhole from a wellhead 112. The wellbore 110 is a vertical wellbore but wireline operations can also be performed in other wellbores, for example, slanted or horizontal wellbores. In the wireline operation 100, the wellbore 110 penetrates through five layers 114, 116, 118, 120, 122 of a subsurface formation 124. A control truck 128 lowers a logging tool 132 (e.g., a sidewall coring tool) down the wellbore 110 on a wireline 136.

The logging tool 132 is string of one or more instruments with sensors operable to measure petrophysical properties of the subsurface formation 124. For example, logging tools can include resistivity logs, borehole image logs, porosity logs, density logs, or sonic logs. Resistivity logs measure the subsurface electrical resistivity, which is the ability to impede the flow of electric current. These logs can help differentiate between formations filled with salty waters (good conductors of electricity) and those filled with hydrocarbons (poor conductors of electricity). Porosity logs measure the fraction or percentage of pore volume in a volume of rock using acoustic or nuclear technology. Acoustic logs measure characteristics of sound waves propagated through the well-bore environment. Nuclear logs utilize nuclear reactions that take place in the downhole logging instrument or in the formation. Density logs measure the bulk density of a formation by bombarding it with a radioactive source and measuring the resulting gamma ray count after the effects of Compton scattering and photoelectric absorption. Sonic logs provide a formation interval transit time, which typically a function of lithology and rock texture but particularly porosity. The logging tool includes a piezoelectric transmitter and receiver and the time taken for the sound wave to travel the fixed distance between the two is recorded as an interval transit time.

As the logging tool 132 travels downhole, measurements of formations properties are recorded to generate a well log. In the illustrated operation, the data are recorded at the control truck 128 in real-time. Real-time data are recorded directly against measured cable depth. In some well-logging operations, the data is recorded at the logging tool 132 and downloaded later. In this approach, the downhole data and depth data are both recorded against time The two data sets are then merged using the common time base to create an instrument response versus depth log.

In the wireline operation 100, the well logging is performed on a wellbore 110 that has already been drilled. In some operations, well logging is performed in the form of logging while drilling techniques. In these techniques, the sensors are integrated into the drill string and the measurements are made in real-time, during drilled rather using sensors lowered into a well after drilling.

Using a wireline coring tool, core samples can be obtained in addition to obtaining well logs. A core sample is a usually cylindrical piece of the subsurface formation that is removed by a special drill and brought to the surface. Core samples can be used to measure petrophysical properties of the subsurface formation such as grain size, porosity, permeability, and unconformity. Core samples can be taken from the sidewalls of a drilled well. When sidewall core samples are repeated along the length of the well, the properties measured from the core samples can be compared and correlated with well logging measurements.

Figure 2B:
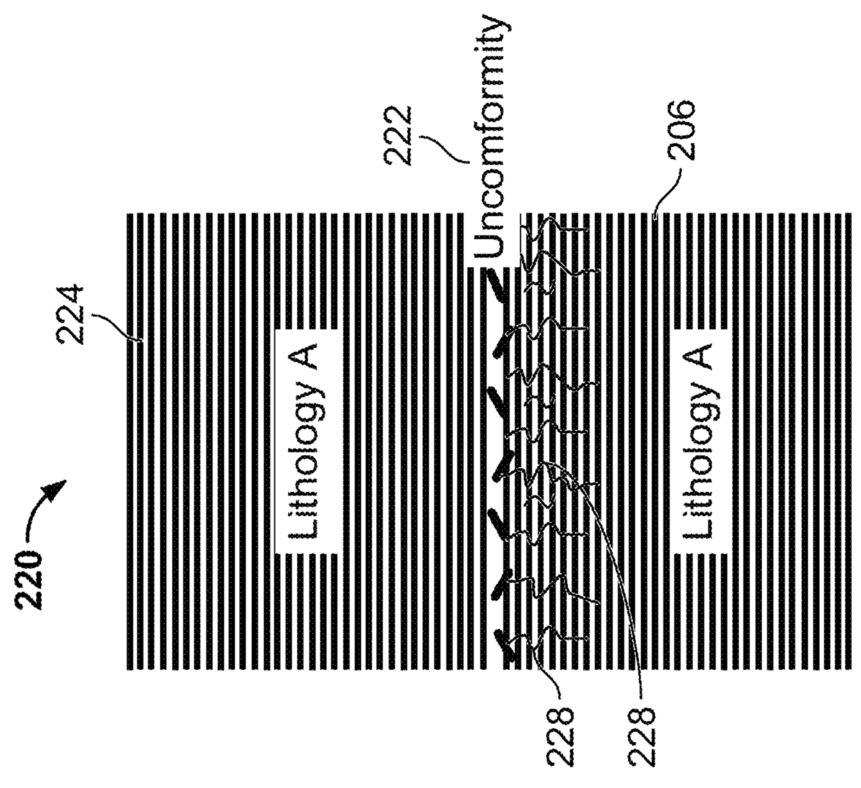
FIGS. 2A-2B are schematics illustrating unconformities with and without lithology contrast.
Figure 2A:
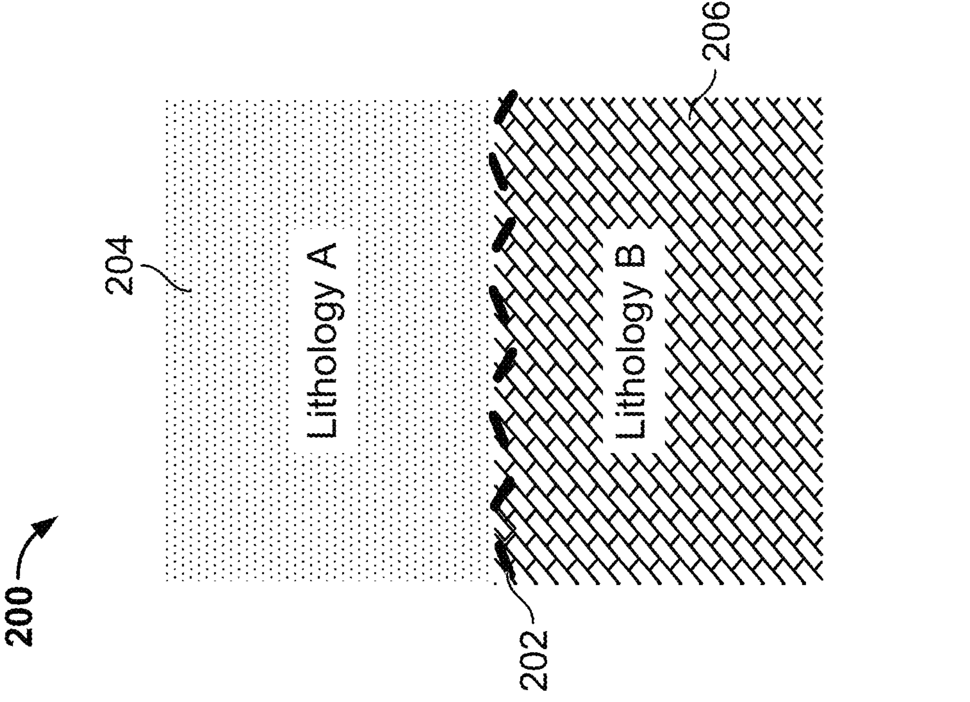

FIG. 2A is a schematic illustration of an example subsurface formation 200 having an unconformity 202 with lithology contrast. The upper rock layer 204 above the unconformity 202 has one type of lithology (e.g., lithology A). The lower rock layer 206 below the unconformity 202 has a different orientation and/or a different type of lithology (e.g., lithology B). With the lithology contrast between the upper rock layer 204 and the lower rock layer 206, the unconformity 202 can be recognized using, for example, lithology logs or seismic sections.

FIG. 2B is a schematic illustration of an example subsurface formation 220 having an unconformity 222 without lithology contrast. The upper rock layer 224 and the lower rock layer 226 have the same orientation and lithology (e.g., lithology A). The unconformity 222 can be difficult to recognize using lithology logs or seismic sections. Fractures 228 occur at the location of the unconformity 222. Borehole image logs can capture fractures 228. The images can be analyzed, and variations in fracture density and orientation can indicate the location of the unconformity 222.

Figure 3:
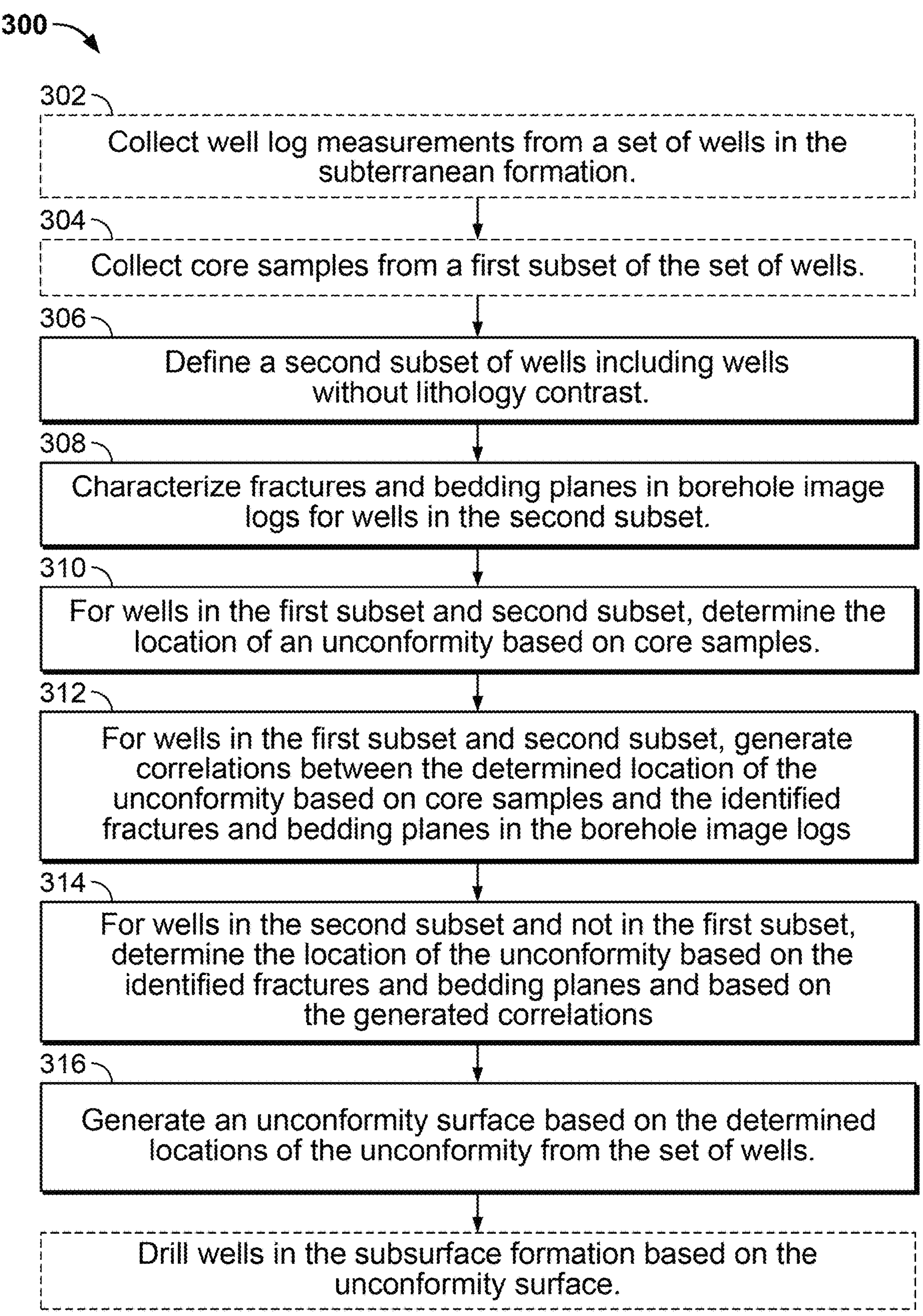
FIG. 3 is a flow chart of a method for identifying an unconformity.

FIG. 3 is a flow chart of an example method 300 for identifying an unconformity in a subsurface formation. The method 300 recognizes unconformity and identifies stratigraphic hiatus based on characterizing fracture and bedding planes using borehole image logs. The method 300 can be used to identify unconformities in subsurface formations without lithology contrasts above and below the unconformity. The method 300 determines the lateral extent and vertical location of the unconformity throughout the subsurface formation.

Well log measurements from a set of wells in the subsurface formation are collected (step 302). The well log measurements include gamma ray logs, porosity logs, and borehole image logs. The well log measurements can be collected, for example, by a wireline logging operation 100 as described in reference to FIG. 1. In some implementations, the well log measurements are collected in a logging while drilling operation. The presence of an unconformity in the subsurface formation can be identified based on previously collected data. In some implementations, a data processing system accesses the well log measurements from a data store.

Core samples from a first subset of the set of wells are collected (step 304). Core samples do not need to be collected from every well for which well log measurements are collected. Core samples can be collected from wells with and without lithology contrasts. In some implementations, the data processing system accesses previously collected core sample data from a data store. In some implementations, previously collected data from, for example, previous studies and outcrops, can indicate the presence of the unconformity with fracture density and orientation contrast in place of collecting core samples.

A second subset of the set of wells is identified (step 306). The second subset of wells includes wells without lithology contrast. Gamma ray logs and porosity logs can be used to determine if lithology contrasts exist for a well. The second subset can include wells from which core samples were collected (e.g., the first and second subsets of wells are not mutually exclusive).

Fractures and bedding planes are characterized based on the borehole image logs for wells in the second subset (step 308). For example, borehole image logs can be processed to identify fracture orientation and density, bedding dip, and angular discordance.

For wells included in the first subset and the second subset (e.g., wells with core samples and without lithology contrasts), the locations of the unconformity in the wells are determined based on the collected core samples (step 310). For example, the core samples are analyzed to determine the presence of an unconformity, and the vertical location of the unconformity is determined based on the location from which the core samples were taken. For example, fracture contrast in the core sample can be used to identify the unconformity without lithology contrasts.

For wells included in the first and second subsets, correlations between the determined location of the unconformity based on the core samples and the identified fractures and bedding planes in the borehole image logs are generated (step 312). For example, the borehole image logs are processed to characterize the subsurface formation above and below the unconformity. The features (e.g., fracture density or orientation) identified in the borehole images in the formation above and below the unconformity can be useful for cross-correlations, feature recognition, and pattern-matching with borehole images from uncored wells. For example, a fracture contrast identified in core samples and borehole image logs from a cored well can be correlated or matched with fracture contrast in a borehole image log from an uncored well to identify the location of the unconformity.

In some implementations, the borehole image logs are labeled with the location of the unconformity based on the location determined using the core samples. The labeled borehole image logs form a set of training data for a machine learning model. A data processing system, such as a computer or control system, trains a machine learning model, for example, a convolutional neural network or a fully connected neural network using the training data to identify the location of an unconformity. The machine learning model takes as input images from a borehole image log. The machine learning model generates, for example, a probability of the presence of an unconformity in the input image. In some implementations, the machine learning model labels the borehole image log with the location of an unconformity. The data processing system can determine the location of the unconformity based on the machine learning model output.

For wells included in the second subset and not included in the first subset (e.g., uncored wells without lithology contrast), the locations of the unconformity in the wells are determined based on the characterized fractures and bedding planes and based on the generated correlations (step 314). For example, the location of the unconformity can be determined based on changes in the fractures or bedding plane orientations. Changes in fractures can include changes in the number of fractures (e.g., fracture density), changes in the size of fractures, or changes in fracture orientation. The appearance of fractures in the borehole image logs can indicate the location of the unconformity as schematically illustrated in FIG. 2B.

In some implementations, determining locations of the unconformity in wells in the second subset and not in the first subset includes performing a cross-correlation with images from borehole image logs that correspond to locations of an unconformity identified based on core samples. For example, an image with an identified unconformity can be correlated with a borehole image log from a well without lithology contrast and without core samples. A location in the borehole image log with a highest correlation factor can be selected as the location of the unconformity.

In some implementations, determining locations of the unconformity in the wells included in the second subset and not included in the first subset includes labeling borehole image logs by the trained machine learning model.

In some implementations, a third subset of wells including wells with lithology contrast is defined. The location of the unconformity in the third subset of wells can be determined based on changes identified in the porosity logs and the gamma ray logs.

An unconformity surface based on the determined locations of the unconformity from the set of wells is generated (step 316). The locations of the unconformity surface among the set of wells can map the lateral or horizontal extent of the unconformity and the vertical location of the unconformity within the subsurface formation. The unconformity surface can be used in further geological modeling of the subsurface formation.

In some implementations, drilling hazards in the subsurface formation are identified based on the unconformity surface. For example, the formation below the unconformity can be a sinkhole in which a drill bit can get stuck. Thus, the unconformity surface indicates the location of the sinkhole as a drilling hazard. The unconformity surface can be used to determine locations to drill additional wells in the subsurface formation. Wells can be drilled based on the identified drilling hazards and determined locations to drill wells. In some implementations, the data processing system generates control commands to control drilling equipment based on the identified drilling hazards and the determined locations to drill wells.

Figures 4A, 4B:
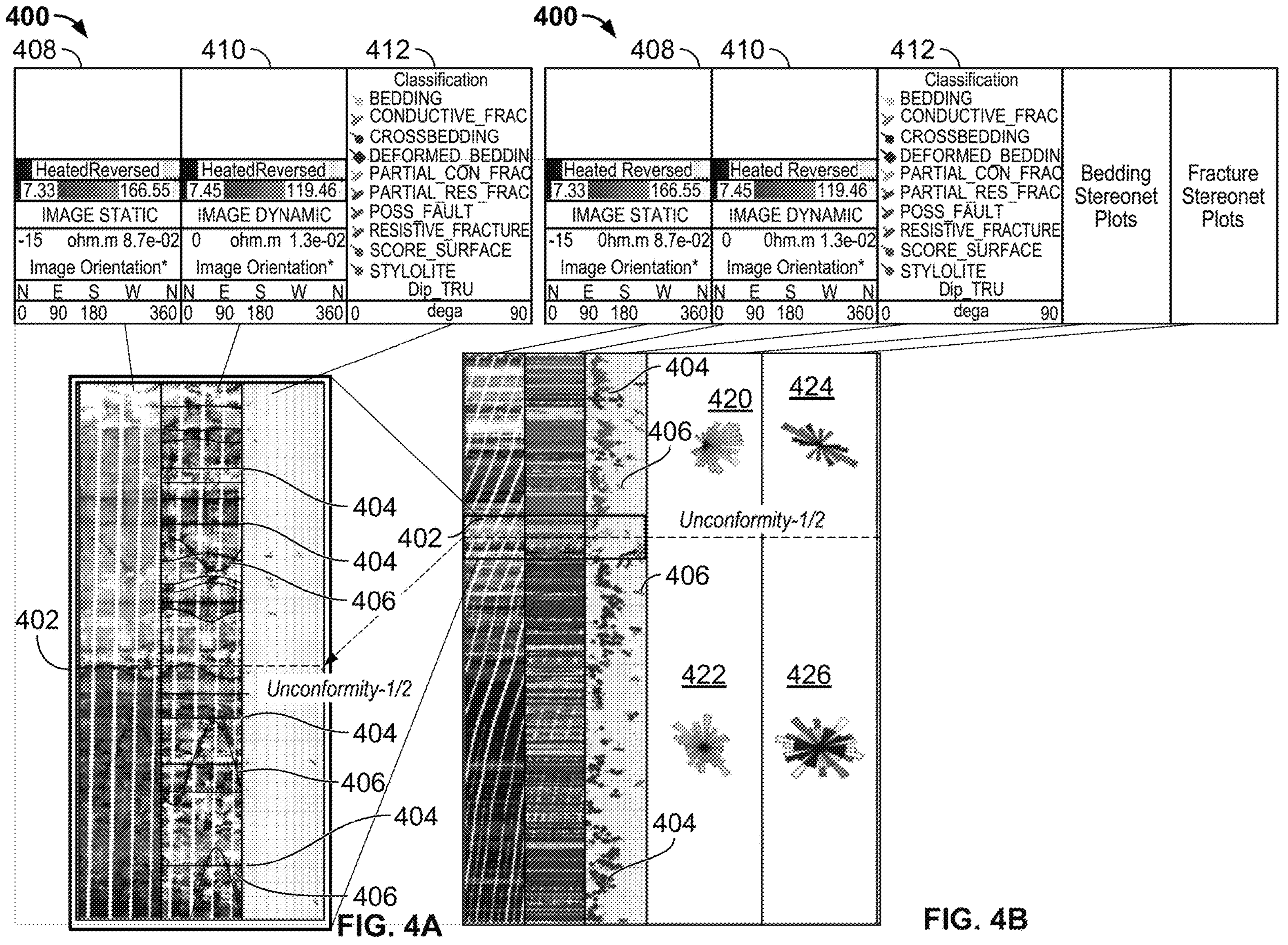
FIGS. 4A-4B show borehole image logs with fracture and bedding interpretation for a well without lithology contrast.

FIG. 4A is a portion of an example borehole image log 400 from a subsurface formation without lithology contrast in which an unconformity 402 is identified. The images are processed to characterize the bedding planes 404 and fractures 406 of the subsurface formation. The first column 408 shows the raw borehole images. The second column 410 highlights interpreted features in the images, such as bedding planes 404 and fractures 406. The third column 412 shows the interpretation of the features. The bedding planes 404 above and below the unconformity 402 have the same orientation indicating no lithology contrast.

FIG. 4B shows a longer portion of the borehole image log 400 than is shown in FIG. 4A. The borehole image log interpretation is summarized in bedding stereonet plots 420, 422 and fracture stereonet plots 424, 426. The difference in the bedding planes 404 and fractures 406 between the formation above the unconformity 402 and the formation below the unconformity 402 are seen in the stereonet plots 420-426. For example, the bedding stereonet plot 420 is skewed toward the east and southeast, and fracture stereonet plot 424 above the unconformity has a diagonal slant from northwest to southeast. The bedding stereonet plot 422 and fracture stereonet plot 426 below the unconformity 402 are more evenly distributed circumferentially.

Figure 5:
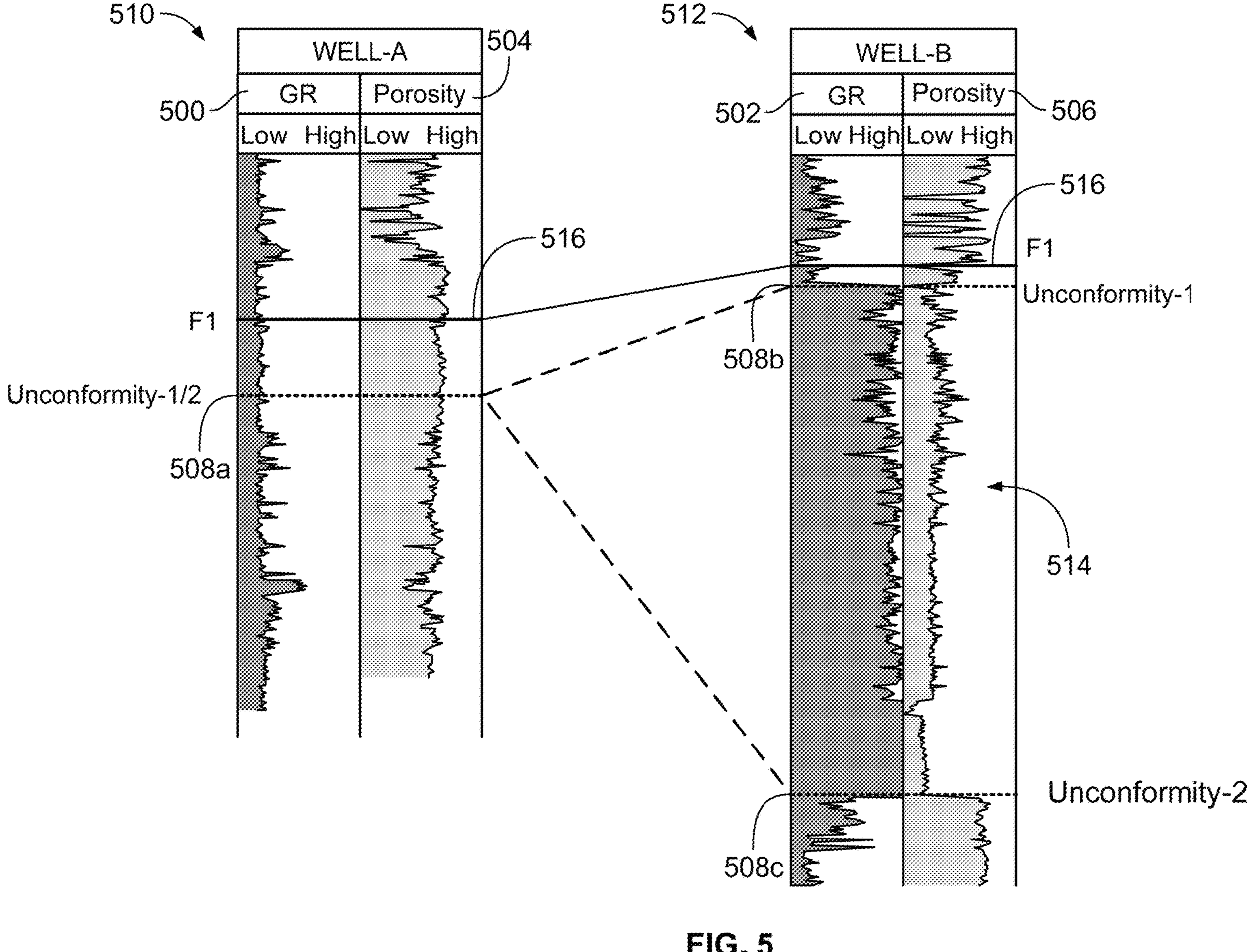
FIG. 5 depicts a correlation for generating an unconformity surface with well logs from a well without lithology contrast and a well with lithology contrast.

FIG. 5 shows gamma ray logs 500, 502 and porosity logs 504, 506 from wells drilled in a subsurface formation that has an unconformity 508*a*-*c*. Well A 510 does not have a lithology contrast, and Well B 512 does have a lithology contrast 514. A geological feature 516 is identified in both wells 510-512. The unconformity 508*a* is identified in Well A 510 from borehole image logs using the method 300. In Well B 512, two unconformities 508*b*-*c* are identified based on the lithology contrast 514 indicated by the elevated levels of the gamma ray log 502 and the lowered levels of the porosity log 506. The locations of the unconformity 508*a* from Well A 510 is correlated with the locations of the unconformity 508*b*-*c* in Well B 512 to generate an unconformity surface mapping the lateral extent and vertical location of the unconformity 508*a*-*c* in the subsurface formation.

Figure 6:
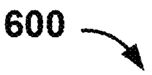
FIG. 6 is an unconformity surface.
Figure 6:
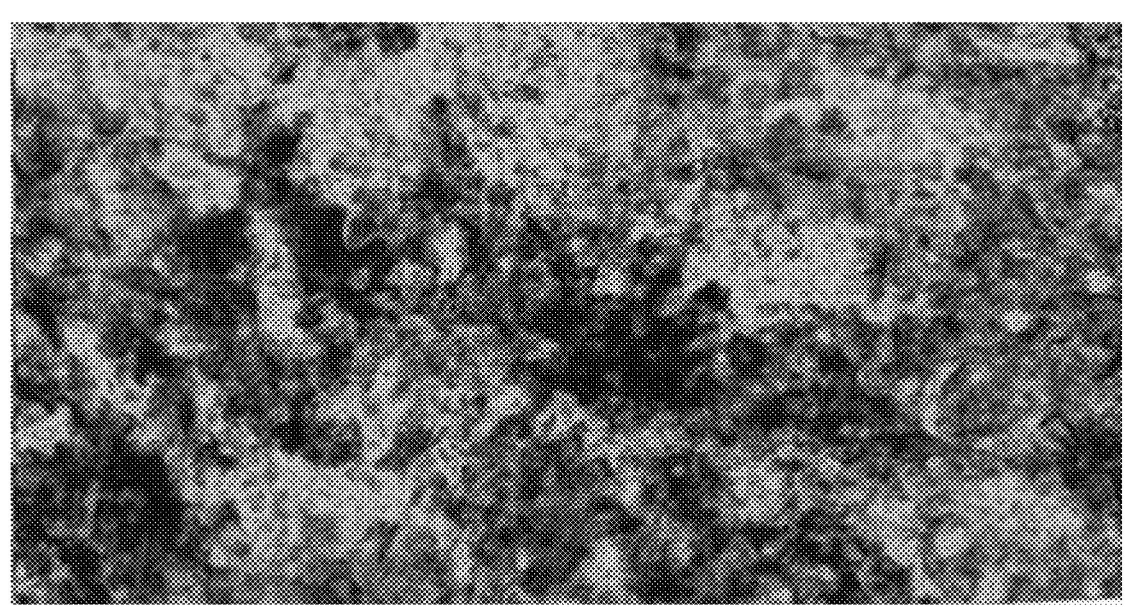

FIG. 6 is an example unconformity surface 600 generated by an implementation of the method 300. The intensity of the unconformity surface 600 represents the depth of the unconformity in the subsurface formation. The unconformity surface 600 can indicate the location of drilling hazards such as sinkholes that may exist in the subsurface formation.

Figure 7:
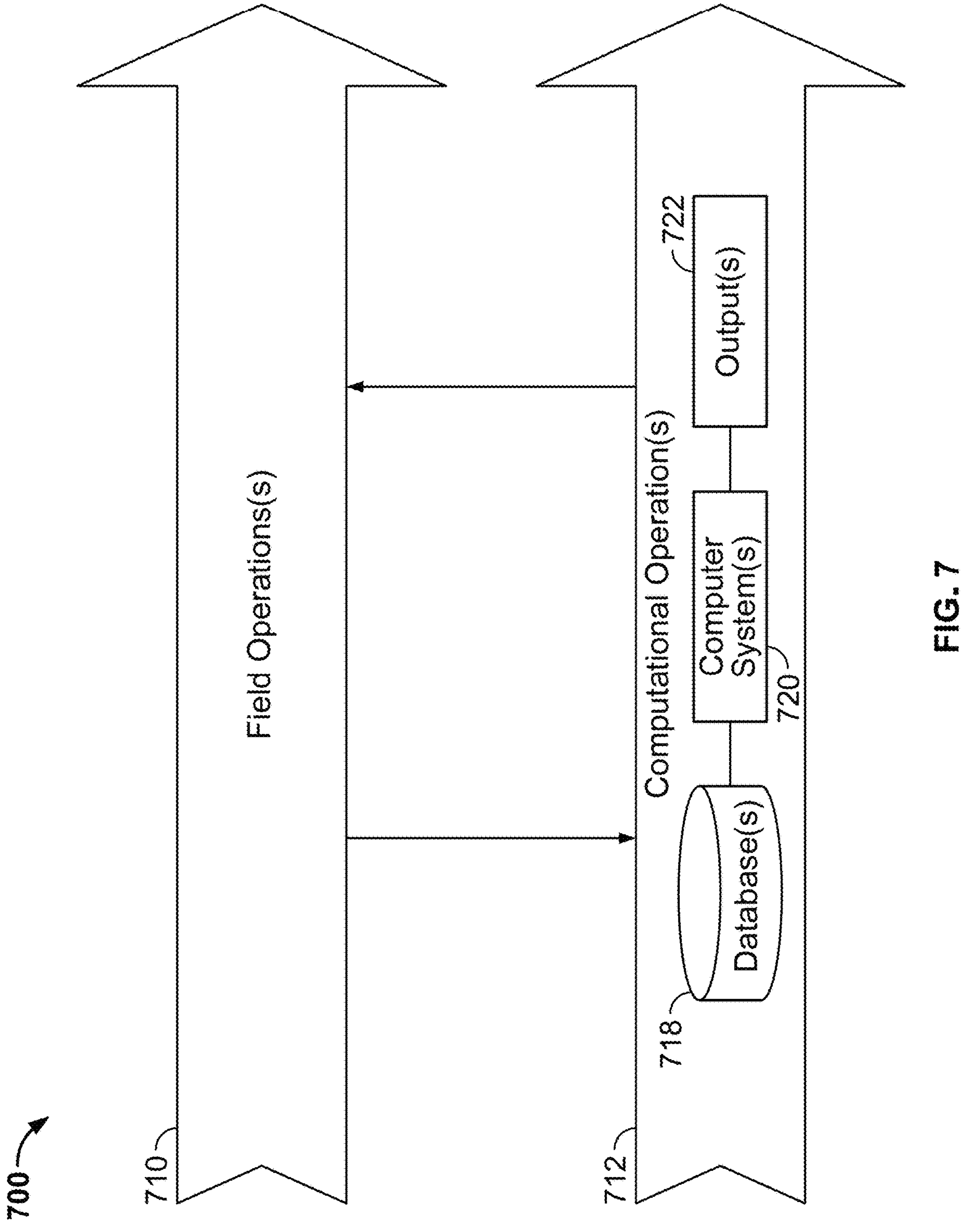
FIG. 7 illustrates hydrocarbon production operations that include field operations and computational operations.

FIG. 7 illustrates hydrocarbon production operations 700 that include both one or more field operations 710 and one or more computational operations 712, which exchange information and control exploration for the production of hydrocarbons. In some implementations, outputs of techniques of the present disclosure (e.g., the method 300) can be performed before, during, or in combination with the hydrocarbon production operations 700, specifically, for example, either as field operations 710 or computational operations 712, or both. For example, the method 300 collects data during field operations, processes the data in computational operations, and can determine locations to perform additional field operations.

Examples of field operations 710 include forming/drilling a wellbore, hydraulic fracturing, producing through the wellbore, injecting fluids (such as water) through the wellbore, to name a few. In some implementations, methods of the present disclosure can trigger or control the field operations 710. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 710 and responsively triggering the field operations 710 including, for example, generating plans and signals that provide feedback to and control physical components of the field operations 710. Alternatively, or in addition, the field operations 710 can trigger the methods of the present disclosure. For example, implementing physical components (including, for example, hardware, such as sensors) deployed in the field operations 710 can generate plans and signals that can be provided as input or feedback (or both) to the methods of the present disclosure.

Examples of computational operations 712 include one or more computer systems 720 that include one or more processors and computer-readable media (e.g., non-transitory computer-readable media) operatively coupled to the one or more processors to execute computer operations to perform the methods of the present disclosure. The computational operations 712 can be implemented using one or more databases 718, which store data received from the field operations 710 and/or generated internally within the computational operations 712 (e.g., by implementing the methods of the present disclosure) or both. For example, the one or more computer systems 720 process inputs from the field operations 710 to assess conditions in the physical world, the outputs of which are stored in the databases 718. For example, seismic sensors of the field operations 710 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 712 where they are stored in the databases 718 and analyzed by the one or more computer systems 720.

In some implementations, one or more outputs 722 generated by the one or more computer systems 720 can be provided as feedback/input to the field operations 710 (either as direct input or stored in the databases 718). The field operations 710 can use the feedback/input to control physical components used to perform the field operations 710 in the real world.

For example, the computational operations 712 can process the seismic data to generate three-dimensional (3D) maps of the subsurface formation. The computational operations 712 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 712 to process new information about the formation and control the drilling to adjust to the observed conditions in real-time.

The one or more computer systems 720 can update the 3D maps of the subsurface formation as information from one exploration well is received and the computational operations 712 can adjust the location of the next exploration well based on the updated 3D maps. Similarly, the data received from production operations can be used by the computational operations 712 to control components of the production operations. For example, production well and pipeline data can be analyzed to predict slugging in pipelines leading to a refinery and the computational operations 712 can control machine operated valves upstream of the refinery to reduce the likelihood of plant disruptions that run the risk of taking the plant offline.

In some implementations of the computational operations 712, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 8:
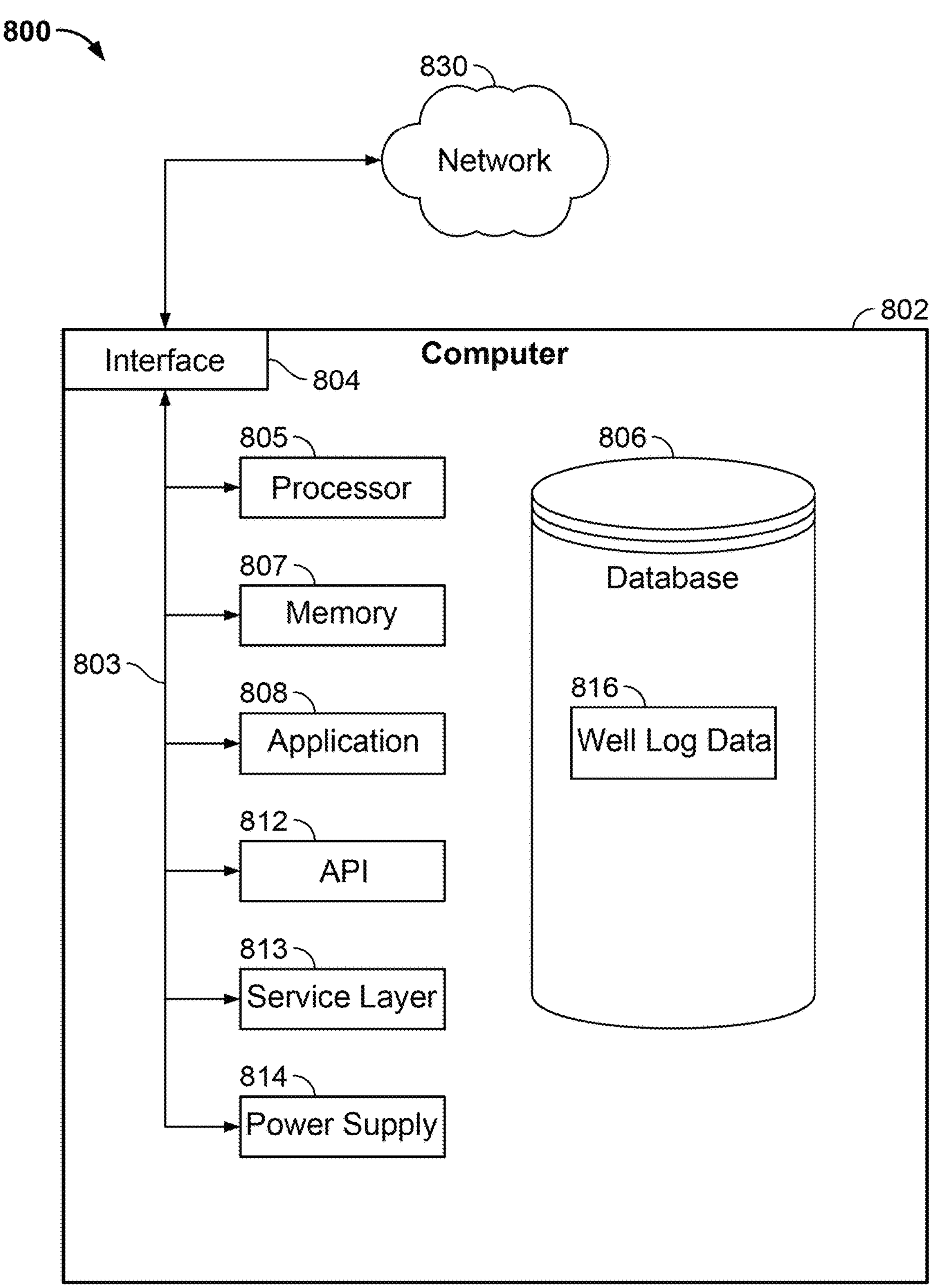
FIG. 8 is a block diagram illustrating an example computer system used to provide computational functionalities associated with described algorithms, methods, functions, processes, flows, and procedures according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user-or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware-or software-based (or a combination of both hardware-and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for identifying an unconformity in a subsurface formation, the method comprising:

collecting well log measurements from a set of wells in the subsurface formation, the well log measurements comprising gamma ray logs, porosity logs, and borehole image logs;

collecting core samples from a first subset of the set of wells;

identifying a second subset of the set of wells including wells without lithology contrast based on the gamma ray logs and the porosity logs;

characterizing fractures and bedding planes in the borehole image logs for wells in the second subset;

for wells included in the first subset and the second subset:

determining a location of the unconformity in the wells based on the core samples;

generating correlations between the determined location of the unconformity based on the core samples and the identified fractures and bedding planes in the borehole image logs;

for wells included in the second subset and not included in the first subset:

determining the location of the unconformity in the wells based on the identified fractures and bedding planes and based on the generated correlations; and generating an unconformity surface based on the determined locations of the unconformity from the set of wells.

2. The method of claim 1, further comprising: identifying drilling hazards in the subsurface formation based on the unconformity surface.

3. The method of claim 2, further comprising:

determining locations to drill wells in the subsurface formation based on the identified drilling hazards; and drilling wells in the subsurface formation based on the determined locations.

4. The method of claim 1, further comprising:

determining that wells of the set of wells comprise a lithology contrast defining a third subset of the set of wells; and determining the location of the unconformity in the wells of the third subset based on the porosity logs and the gamma ray logs.

5. The method of claim 1, wherein generating correlations comprises training a machine learning model using well log data labeled based on core sample data.

6. The method of claim 5, wherein determining locations of the unconformity in the wells included in the second subset and not included in the first subset comprises labeling borehole image logs by the trained machine learning model.

7. The method of claim 1, wherein determining locations of the unconformity in the wells included in the second subset and not included in the first subset comprises performing cross-correlations between borehole image logs with the identified unconformity and borehole image logs of the wells included in the second subset and not included in the first subset; and selecting the location within the well with a highest correlation factor.

8. The method of claim 1, wherein identifying fractures and bedding planes in the borehole image logs comprises identifying fracture density and orientation.

9. A system for identifying unconformities in a subsurface formation, the system comprising:

at least one processor; and a memory storing instructions that, when executed by the at least one processor, cause the at least one processor to perform operations comprising:

accessing, from a data store, well log measurements from a set of wells in the subsurface formation, the well log measurements comprising gamma ray logs, porosity logs, and borehole image logs;

accessing, from a data store, core sample data from a first subset of the set of wells;

identifying a second subset of the set of wells including wells without lithology contrast based on the gamma ray logs and the porosity logs;

characterizing fractures and bedding planes in the borehole image logs for wells in the second subset;

for wells included in the first subset and the second subset:

determining a location of the unconformity in the wells based on the core sample data;

generating correlations between the determined location of the unconformity based on the core sample data and the identified fractures and bedding planes in the borehole image logs;

for wells included in the second subset and not included in the first subset:

determining the location of the unconformity in the wells based on the identified fractures and bedding planes and based on the generated correlations; and generating an unconformity surface based on the determined locations of the unconformity from the set of wells.

10. The system of claim 9, wherein the operations further comprise: identifying drilling hazards in the subsurface formation based on the unconformity surface.

11. The system of claim 10, wherein the operations further comprise:

determining locations to drill wells in the subsurface formation based on the identified drilling hazards; and drilling wells in the subsurface formation based on the determined locations.

12. The system of claim 9, wherein the operations further comprise:

determining that wells of the set of wells comprise a lithology contrast defining a third subset of the set of wells; and determining the location of the unconformity in the wells of the third subset based on the porosity logs and the gamma ray logs.

13. The system of claim 9, wherein generating correlations comprises training a machine learning model using well log data labeled based on the core sample data.

14. The system of claim 13, wherein determining locations of the unconformity in the wells included in the second subset and not included in the first subset comprises labeling borehole image logs by the trained machine learning model.

15. The system of claim 9, wherein determining locations of the unconformity in the wells included in the second subset and not included in the first subset comprises performing cross-correlations between borehole image logs with the identified unconformity and borehole image logs of the wells included in the second subset and not included in the first subset; and selecting the location within the well with a highest correlation factor.

16. The system of claim 9, wherein identifying fractures and bedding planes in the borehole image logs comprises identifying fracture density and orientation.

17. One or more non-transitory machine-readable storage devices storing instructions for identifying unconformities in a subsurface formation, the instructions being executable by one or more processors, to cause performance of operations comprising:

accessing, from a data store, well log measurements from a set of wells in the subsurface formation, the well log measurements comprising gamma ray logs, porosity logs, and borehole image logs;

accessing, from a data store, core sample data from a first subset of the set of wells;

identifying a second subset of the set of wells including wells without lithology contrast based on the gamma ray logs and the porosity logs;

characterizing fractures and bedding planes in the borehole image logs for wells in the second subset;

for wells included in the first subset and the second subset:

determining a location of the unconformity in the wells based on the core sample data;

generating correlations between the determined location of the unconformity based on the core sample data and the identified fractures and bedding planes in the borehole image logs;

for wells included in the second subset and not included in the first subset:

determining the location of the unconformity in the wells based on the identified fractures and bedding planes and based on the generated correlations; and generating an unconformity surface based on the determined locations of the unconformity from the set of wells.

18. The non-transitory machine-readable storage devices of claim 17, further comprising: identifying drilling hazards in the subsurface formation based on the unconformity surface.

19. The non-transitory machine-readable storage devices of claim 17, further comprising:

determining that wells of the set of wells comprise a lithology contrast defining a third subset of the set of wells; and determining the location of the unconformity in the wells of the third subset based on the porosity logs and the gamma ray logs.

20. The non-transitory machine-readable storage devices of claim 17, wherein generating correlations comprises training a machine learning model using well log data labeled based on the core sample data; and wherein determining locations of the unconformity in the wells included in the second subset and not included in the first subset comprises labeling borehole image logs by the trained machine learning model.

* * * * *